United States Patent Office 3,496,378
Patented Feb. 17, 1970

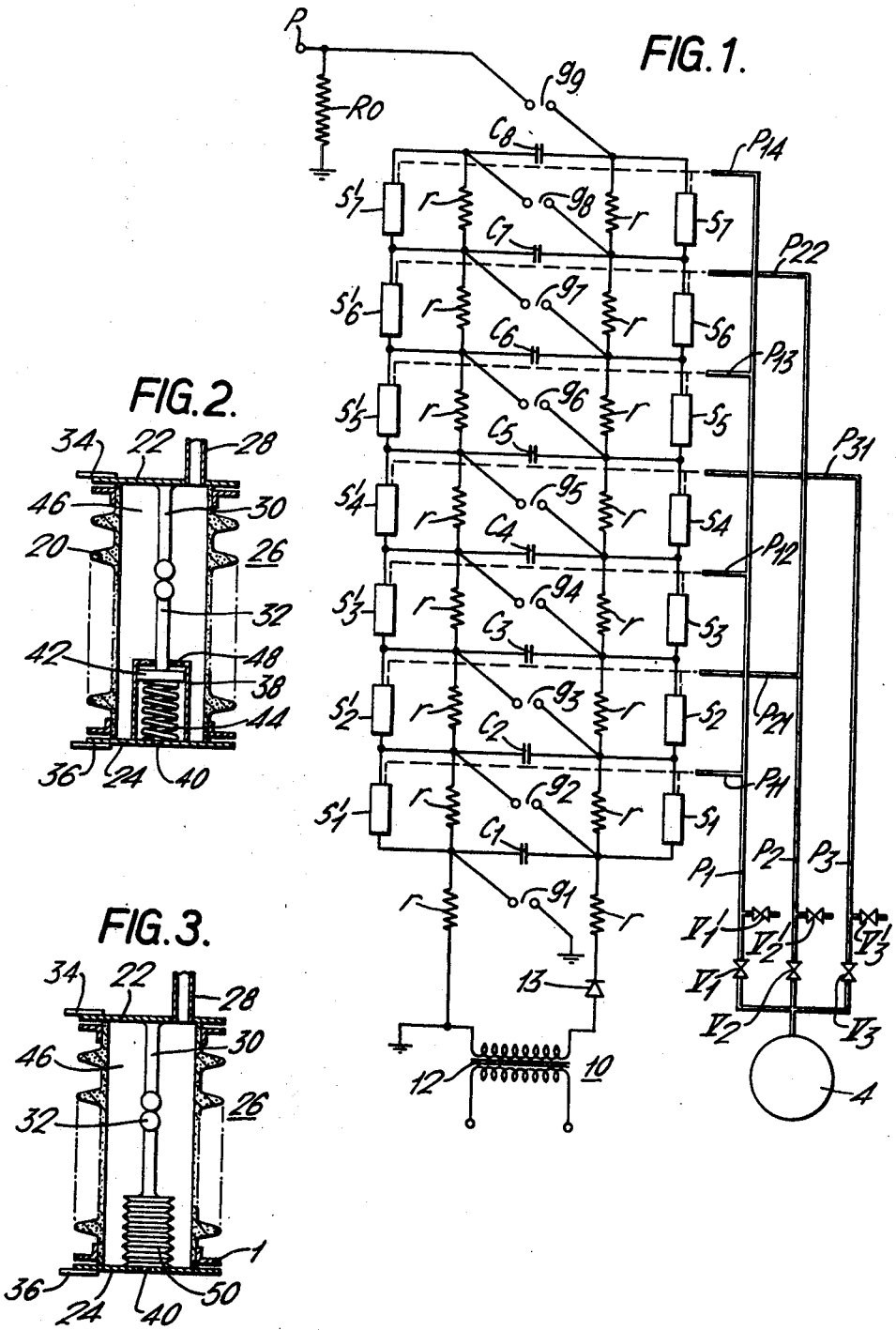

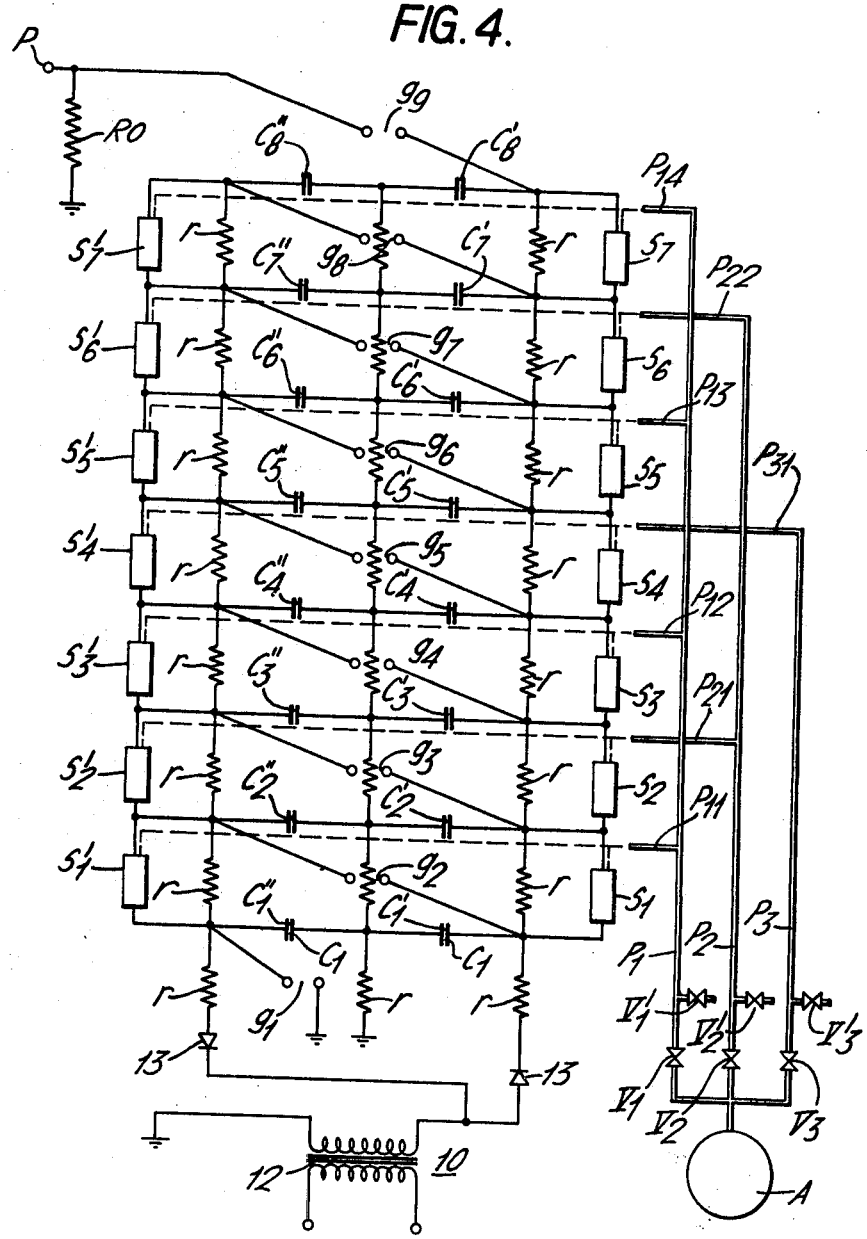

3,496,378
SELECTIVELY INTERCONNECTED PARALLEL CHARGE, SERIES DISCHARGE, CAPACITIVE IMPULSE VOLTAGE GENERATOR
Teiichi Sakamoto, 21–4, 3-chome, Furuedai,
Suita, Osaka, Japan
Filed May 5, 1967, Ser. No. 636,517
Claims priority, application Japan, May 11, 1966,
41/30,096
Int. Cl. H02m 3/18
U.S. Cl. 307—110    5 Claims

ABSTRACT OF THE DISCLOSURE

Apparatus for generating an impulse voltage, which comprises a plurality of capacitor means; a source of electricity for charging said capacitor means; a plurality of discharge gaps for serially connecting said capacitor means for discharge; and which is characterized by the provision of a plurality of switches each operable by an insulating pressurized fluid and connected between the terminals of the same polarity of each adjacent pair of said capacitors; a source of said pressurized fluid; conduit means made of insulating material for supplying said pressurized fluid to said switches to operate the same; and valve means associated with said conduit means for controlling the supply of said fluid to said switches so as to connect and disconnect said capacitor terminals, thereby forming a desired number of parallel combinations of capacitor means, which are to be connected in series with the rest of said capacitor means through said gaps for discharge.

---

Generally, a high impulse voltage generator comprises many capacitors so arranged that they are connected in parallel with a source of electricity when they are to be charged, and that after they have been charged to a predetermined voltage level, they are connected in series with each other through discharge gaps for discharge. To vary the level of the high impulse voltage to be generated, the charged voltage of the capacitors may be changed. However, once an impulse voltage generator has been manufactured with a predetermined rated charged voltage, the terminal voltage of each charged capacitor has a predetermined rated level, so that each discharge gap has a predetermined length corresponding to the rated terminal voltage. Suppose that the charged voltage of each capacitor has been changed in order to change the impulse voltage to be produced. If the new level of the charged voltage is much lower than the rated voltage level, the discharge gap will be too long to effect the discharge of the series capacitors, and it is very difficult to adjust the length of the discharge gap of each capacitor. The discharge energy of a capacitor is proportional to the nquare of the charged voltage, so that a decrease in the charged voltage results in a greater decrease in the discharge energy.

There are two methods of obtaining a desired level of impulse voltage lower than the rated level without changing the charged voltage of each capacitor:

(1) Grouping some of the capacitors provided in the system into one or more parallel capacitor circuits, which are dealt with as a single capacitor. For discharge, these parallel capacitor circuits are connected in series with the other capacitors. For example, suppose that there are $m$ capacitors in all provided in the system, $n$ of which are arranged to constitute $p$ parallel capacitor circuits. If the charged voltage of each capacitor is V volts, the impulse voltage generated will be expressed by $mV/n=pV$ provided that the availability of the charged voltage be 100%. With this method, it is possible to utilize the charged energy of all the capacitors in the system.

(2) Using as many of the capacitors provided in the system as are required to attain the desired level of impulse voltage. Suppose that there are $m$ capacitors in all provided in the system, $n'$ of which are used. The voltage produced will be $n'V$ volts. In this case, the impulse voltage obtained will be reduced to $$\frac{n'}{m} \times 100\%$$

of the rated level obtained by the use of all the capacitors provided.

Method (1) is ideal, but the mode of connection of the capacitors must be changed in accordance with the voltage level to be obtained. Such changes in the connection may be effected by means of relays, but since they must be positioned at a high potential portion of the system, there are serious problems to be solved as to the operating source of electricity for the relays and their insulation. With method (2), simple switches may be used to separate some of the capacitors from the rest, and such switches may be operated by an insulating rod. However, the method has the disadvantage that it is impossible to use the whole energy of all the capacitors provided in the system.

Accordingly, the primary object of the invention is to provide an apparatus for generating an impulse voltage, which is capable of generating an impulse voltage lower than the rated level, utilizing the whole energy of all the capacitors provided in the apparatus and without changing the charged votage level of each capacitor.

Another object of the invention is to provide such an apparatus as aforesaid which is quick in action and simple in operation.

Basically, the invention utilizes the above-mentioned method (1) and is characterized by the provision of switching means operable by insulating fluid to change the mode of connection of the capacitors provided so as to form a desired number of parallel capacitor circuits. The apparatus of the invention comprises a plurality of capacitors so arranged that in accordance with the impulse voltage level to be attained they can be grouped into a required number of parallel capacitor circuits by means of switches operated by insulating pressurized fluid. The switch operating fluid is controlled by a plurality of valves placed near ground. The number of capacitors to be connected in parallel and the number of parallel capacitor circuits to be formed are determined by which of the valves are closed or opened. The switches are operated by insulating pressurized fluid, so that no operating source of electricity therefore is required and no particular consideration needs be given to the insulation of the switches. The supply of the pressurized fluid is controlled by the valves placed near ground, so that the operation of the valves is simple and easy.

The invention will be better understood from the following description of some preferred embodiments thereof with reference to the accompanying drawings, wherein:

FIG. 1 schematically shows one embodiment of the invention;

FIG. 2 is a vertical section of the switches used in the invention;

FIG. 3 is a vertical section of a modified form of FIG. 2; and

FIG. 4 is a schematic circuit diagram of another embodiment of the invention.

Referring to FIG. 1, there is shown a DC power supply circuit 10 comprising a transformer 12 and a rectifier 13. A plurality of stacked up capacitors C1 to C8 are connected so as to be charged through resistors r with the DC voltage supplied from the circuit 10. A discharge gap g2 to g8 is connected between the terminals of the opposite polarity of each adjacent pair of the capacitors. The lowest capacitor C1, however, has its terminal other than the terminal which is connected through the gap g2 to the capacitor C2 connected to ground through a gap g1. The uppermost capacitor C8 has its terminal other than the terminal which is connected through the gap g8 to the capacior C7 connected to an output terminal P through a gap g9. A discharge resistor Ro is connected between the terminal P and ground.

With their respective right-hand terminals as viewed in FIG. 1 being positive in polarity, the capacitors C1 to C8 are charged to the voltage level provided by the power supply 10. Under the condition, if the air-gap g1 is acted on by any suitable means to cause a discharge to occur thereacross, discharge occurs across the other gaps successively upwardly from the next lowest gap g2, until there appears between the output terminal P and ground a voltage whose value is equal to the sum of the charged voltages of all the capacitors. So far there is nothing new in the arrangement and operation. In accordance with the invention, however, a plurality of switches S1 to S7 and S'1 to S'7 are connected between the terminals of the same polarity of each adjacent pair of the capacitors C1 to C8. These switches are operated by a suitable pressurized fluid such as compressed air or insulating oil supplied from a source A through pipes P1, P2 and P3. The pipes have three valves V1, V2 and V3, respectively, to control the supply of the pressurized fluid from the source and are connected to the open air through similar valves V'1, V'2 and V'3, respectively. These valves may be manually or electromagnetically operated. The pipes are preferably made of a pressure resistive, flexible and insulating material such as polyethylene, vinyl chloroide, or rubber.

As shown in FIG. 2, each switch comprises a casing 26 consisting of a bushing 20 and a pair of lid members 22 and 24 tightly closing the opposite ends of the bushing. The upper lid 22 has a pipe 28 communicating the interior chamber 46 of the casing with one of the above-mentioned fluid supply pipes. The casing 26 encloses a fixed electrode 30 and a movable electrode 32. The electrode 30 hangs from the upper lid 22 and is connected by a lead (not shown) to a terminal 34 fixed to the upper lid 22. The other electrode 32 is connected by a lead (not shown) to a terminal fixed to the lower lid 24. A cylinder 38 is mounted on the lower lid inside the casing 26. The lower lid has a hole 40 which communicates the interior of the cylinder 38 with atmosphere. The cylinder encloses a piston 42 formed on the lower end of the movable electrode 32 and a coil spring 44 normally urging the piston upward. The cylinder chamber communicates with the casing chamber 46 through a port 48 formed in the cylinder wall.

Under normal condition, the piston 42 is urged by the spring 44 upward so that the electrodes 30 and 32 contact. In other words, normally the switch is closed. Suppose that a pressurized fluid is supplied through the pipe 28 into the chamber 46 of the switch casing. The fluid flows into the cylinder through the port 48, thereby moving the piston 42 and consequently the electrode 32 downward against the resiliency of the spring 44. This breaks the contact between the electrodes 30 and 32, thereby opening the switch. It will be easily seen that evacuation of the fluid from the cylinder chamber causes the electrodes to make contact again by the resiliency of the spring 44.

In FIG. 3, the cylinder and piston of FIG. 2 are replaced by a bellow 50, to the upper end face of which the movable electrode 32 is secured. The bellow normally in its expanded position as shown by its own resiliency or a coil spring (not shown) enclosed therein, thereby making contact between the two electrodes. Pressurized fluid supplied through the pipe 28 into the casing chamber 46 compresses the bellow 50, with the air inside it being evacuated through the hole 40, thereby breaking the contact between the two electrodes.

Returning to FIG. 1, the pipe P1 has branch pipes P11, P12, P13 and P14. The pipe 11 is connected to the pipe 28 of the switches S1 and S'1. In like manner, the pipes P12, P13 and P14 are connected to the switches S3, S'3; S5, S'5; and S7, S'7, respectively. The pipe P2 has branch pipes P21 and P22 connected to the switches S2, S'2 and S6, S'6, respectively; and the pipe P3 has a branch pipe 31 connected to the switches S4 and S'4.

When all the valves V1, V2 and V3 are opened, with the valves V'1, V'2 and V'3 having been closed, all the switches are opened, as will be easily seen from the foregoing description. Under the condition, the capacitors C1 to C9 are parallely charged through the resistors r, and serially discharged though the gaps g1 to g9.

Now, close the valve V1 simultaneously opening the valve V'1, and the pipes P11, P12 and P13 will be opened to atmosphere, so that the switches S1, S'1, S3, S'3, S5, S'5, S7 and S'7 will be closed. A a result, the positive terminals of the capacitors C1 and C2 are connected by the switch S1 and their negative terminals, by the switch S'1; and in like manner, the capacitors C3 and C4, C5 and C6, and C7 and C8 have their respective positive and negative terminals connected by the switches S3 and S'3, S5 and S'5, and S7 and S'7. In other words, the capacitors C1 and C2, C3 and C4, C5 and C6, and C7 and C8 are parallelly connected, and these four parallel combinations are connected in series through the gaps g3, g5, g7 and g9 between the source 10 and the output terminal P. The condensers are charged under the condition. If the charged voltage of each capacitor is V volts, each parallel combination of the capacitors is charged until the terminal voltage of the combination becomes V volts. Since there are four parallel combinations, the discharge voltage appearing between the output terminal P and ground is one-half of the rated voltage of 8V volts. On the other hand, the discharge energy W of a capacitor is expressed by $W = \frac{1}{2}CV^2$ wherein C is the capacitance of the capacitor and V, the terminal voltage thereof. In the case four parallel combinations of two capacitors are connected in series, the combined capacitance is $C/2$ provided that the capacitance of each capacitor is C, and the voltage between the output terminal P and ground is 4V provided that the terminal voltage of each capacitor is V, so that the whole discharged energy is $4CV^2$. If the eight capacitors are serially discharged, the whole energy discharged is $4CV^2$ since the combined capacitance is $C/8$ and the output discharge voltage is 8V. This means that by opening the valve V'1, it is possible to reduce the generated voltage to one-half of the rated output level without reducing the whole discharged energy. In other words, in accordance with the invention the whole discharge energy of the system can be kept constant regardless of how many of the capacitors are combined into how many parallel circuits.

Now, open the valve V'2 in addition to the already opened valve V'1, and the branch pipes P21 and P22, as well as the branch pipes P11, P12 and P13, will be connected to the open air, so that the switches S2, S'2, S6 and S'6 will be closed in addition to the already closed switches. This establishes a parallel combination of capacitors C1, C2, C3 and C4 and another parallel combination of C5, C6, C7 and C8 connected in series with the first-mentioned parallel combination through the gap g5. In this case, the generated voltage is a quarter of the rated output voltage, but the whole discharge energy remains unchanged.

If all the three valves V'1, V'2 and V'3 are opened, all the switches S1 to S7 and S'1 to S'7 are closed, so that all of the capactiors are parallelly connected. As a result, the voltage generated by the system will be one-eighth of the rated voltage level, but the whole discharged energy remains unchanged.

Thus, in accordance with the invention, it is possible to produce a voltage of a desired level lower than the rated voltage level without any change in the discharge energy; and this is accomplished by changing the mode of connection of the capacitors by means of switches operated by a pressurized fluid. These switches may be simply connected through conduits to a source of pressurized fluid, and the mounting of the switches does not require a high degree of accuracy. The switches are free of any miscontact experienced by purely mechanical switches, and have the advantage that no rain or dust can penetrate into the switches even when they are installed outdoors. The inside of the switches are filled with high pressure gas or insulating oil, so that the gap between the electrodes has a great dielectric strength. For example, with carbonic acid gas having a pressure of 10 kg./cm.$^2$, a gap of 20 mm. can endure a voltage of 200 kv.

In the illustrated embodiments, the discharge gaps of an exposed type, but each of them may be enclosed in a casing filled with a high-pressure gas, which may be the carbonic aicd gas supplied from the source A.

FIG. 4, each capacitor C1 to C8 of FIG. 1 is replaced by a series combination of two capacitors C'1 and C"1 to C'8 and C"8, for a larger capacity. Each of the series capacitors is charged with the secondary half-wave voltage of the transformer 12, with the junction between each series pair of capacitors being grounded. The capacitors C'1 and C'2, . . . , and C'7 and C'8 of each adjacent pair o fthe series combinations have their respective one terminals of the same polarity connected through switches S1, . . . , and S7, respectively, while the capacitors C"1 and C"2, . . . , and C"7 and C"8 at the opposite side of the series combinations have their respective one terminals of the same polarity, which is opposite to the previously mentioned terminals of the capacitors C'1, . . . C'8, connected through switches S'1, . . ., and S'7, respectively. The operation of this arrangement is the same as that of FIG. 1, so that no explanation thereof will be required.

As many of stacked up capacitors as are required may be employed, but preferably the number of the capacitors provided is a multiple of the number of the parallel combinations to be formed.

Having described and illustrated some preferred embodiments of the invention, it should be recognized that they are merely representative, and that many changes and modifications may be made within the scope of the invention as disclosed.

What I claim is:

1. An apparatus for generating an impulse voltage comprising: a plurality of capacitor mens; a source of electricity for charging said capacitor means; a plurality of discharge gaps for serially connecting said capacitor means for discharge; a plurality of switches each operable by an insulating pressurized fluid and connected between the terminals of the opposite polarity of each adjacent pair of said capacitor means; a source of pressurized fluid; conduit means made of insulating material for supplying said pressurized fluid to said switches to operate the same; and valve means associated with said conduit means for controlling the supply of said fluid to said switches so as to connect and disconnect said capacitor terminal, thereby forming a desired number of parallel combinations of capacitor means, which are to be connected in series with the rest of said capacitor means through said gaps for discharge.

2. The apparatus as defined in claim 1, wherein each said switch comprises a casing and a pair of electrodes enclosed therein, one of which is stationary, while the other is movable to make or break contact with said stationary electrode upon introduction or evacuation of said pressurized fluid into or out of said casing.

3. The apparatus as defined in claim 1, wherein each said switch comprises a casing having a chamber communicating with said pressurized fluid supply conduit means, a stationary electrode disposed within said casing chamber, a cylinder disposed within said casing chamber, a piston disposed within said cylinder chamber, a movable electrode disposed within said casing chamber and connected to said piston, a spring normally biasing said piston for said movable electrode to make contact with said stationary electrode, and a hole formed in said cylinder wall for introducing said pressurized fluid into said cylinder thereby to move said piston to break contact between said electrodes.

4. The apparatus as defined in claim 1, wherein each said switch comprises a casing having a chamber communicating with said pressurized fluid supply conduit means, a stationary electrode disposed within said casing chamber, a bellow disposed within said casing chamber, a movable electrode carried on said bellow so as to normally make contact with said stationary electrode, said bellow being compressible by said pressurized fluid introduced into said casing chamber so as to break contact between said electrodes.

5. The apparatus as defined in claim 1, wherein said conduit means are flexible pipes.

References Cited

UNITED STATES PATENTS

| | | | |
|---|---|---|---|
| 1,957,008 | 5/1934 | Brasch et al. | 250—98 X |
| 3,143,612 | 8/1964 | Nigland | 200—82 |
| 3,356,808 | 12/1967 | Dakin et al. | 200—83 X |

BERNARD KONICK, Primary Examiner

J. F. BREIMAYER, Assistant Examiner

U.S. Cl. X.R.

200—82, 83; 307—108